(12) United States Patent
Lee et al.

(10) Patent No.: US 12,240,291 B2
(45) Date of Patent: Mar. 4, 2025

(54) INTEGRATED THERMAL MANAGEMENT SYSTEM FOR VEHICLE

(71) Applicants: Hyundai Motor Company, Seoul (KR); Kia Corporation, Seoul (KR)

(72) Inventors: Sang Shin Lee, Suwon-si (KR); Jong Won Kim, Cheonan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 241 days.

(21) Appl. No.: 17/983,329

(22) Filed: Nov. 8, 2022

(65) Prior Publication Data

US 2023/0302872 A1     Sep. 28, 2023

(30) Foreign Application Priority Data

Mar. 23, 2022   (KR) .................. 10-2022-0035934

(51) Int. Cl.
*B60H 1/00*           (2006.01)
(52) U.S. Cl.
CPC ..... *B60H 1/00342* (2013.01); *B60H 1/00278* (2013.01); *B60H 1/00899* (2013.01)
(58) Field of Classification Search
CPC ........... B60H 1/00342; B60H 1/00278; B60H 1/00899; F25B 31/008; F25B 31/006
See application file for complete search history.

(56) References Cited

U.S. PATENT DOCUMENTS

| 2015/0083379 | A1* | 3/2015 | Ito ............................. F28F 9/00 165/166 |
| 2020/0369108 | A1* | 11/2020 | Kim ................... B60H 1/00921 |
| 2021/0061067 | A1* | 3/2021 | Kim ................... B60H 1/32281 |

FOREIGN PATENT DOCUMENTS

KR            101448656 B1    10/2014

* cited by examiner

*Primary Examiner* — Cassey D Bauer
(74) *Attorney, Agent, or Firm* — Slater Matsil, LLP

(57) ABSTRACT

An embodiment integrated thermal management system for a vehicle includes a main refrigerant line configured to circulate a refrigerant sequentially through a compressor, an inner condenser, an outdoor heat exchanger, and an evaporator, an integrated chiller configured to perform heat exchange between a first coolant flowing through a battery, a second coolant flowing through an electronic component, and the refrigerant, a gas injection refrigerant line branched from a downstream point of the inner condenser of the main refrigerant line based on a flow direction of the refrigerant and connected to the compressor, and a gas injection heat exchanger configured to perform heat exchange between the refrigerant flowing through the gas injection refrigerant line and the refrigerant flowing through the main refrigerant line.

20 Claims, 10 Drawing Sheets

INTEGRATED THERMAL MANAGEMENT SYSTEM FOR VEHICLE

CROSS-REFERENCE TO RELATED APPLICATIONS

This application claims the benefit of Korean Patent Application No. 10-2022-0035934, filed on Mar. 23, 2022, which application is hereby incorporated herein by reference.

TECHNICAL FIELD

The present invention relates to an integrated thermal management system for a vehicle.

BACKGROUND

Recently, due to environmental issues with internal combustion engine vehicles, electric vehicles are experiencing a rise as an eco-friendly option. However, unlike conventional internal combustion engine vehicles which do not require additional energy for heating since the waste heat from the engine can be used to warm up the cabin, the electric vehicles, which have no engine and thus no heat source, require energy to heat the cabin, which leads to a decrease in fuel efficiency. It is true that this shortens the driving range of electric vehicles, causing inconvenience such as the need for frequent charging.

Meanwhile, due to vehicle electrification, not only the indoor thermal management of the vehicle, but also the thermal management of electronic components such as high voltage batteries and motors has become necessary. That is, in the case of electric vehicles, indoor space, batteries, and electronic components have different needs for air conditioning, and thus a technology that can independently respond to these different needs and effectively collaborate to save energy as much as possible is needed. Accordingly, the concept of integrated thermal management of a vehicle is proposed to increase thermal efficiency by integrating overall vehicle thermal management while performing thermal management independently for each configuration.

Yet, the conventional integrated thermal management system for a vehicle has a problem in that the heat absorption efficiency is lowered when a heat pump is operated because the refrigerant flow rate is insufficient under the low outdoor temperature conditions. Accordingly, there was a technical need to increase the efficiency of the heat pump in electric vehicles.

The content described in this background section is only for understanding the background of embodiments of the present invention, and should not be taken as an acknowledgment that it corresponds to the prior art known to those of ordinary skill in the art.

SUMMARY

The present invention relates to an integrated thermal management system for a vehicle. Particular embodiments relate to an integrated thermal management system for a vehicle in which a gas injection type heat pump method with a heat exchanger applied is implemented to increase the refrigerant flow rate, thereby increasing heat absorption efficiency.

Accordingly, embodiments of the present invention have been made keeping in mind problems occurring in the related art, and embodiments of the present invention provide an integrated thermal management system for a vehicle in which a gas injection type heat pump method with a heat exchanger applied is implemented to increase the refrigerant flow rate, thereby increasing heat absorption efficiency.

According to an embodiment of the present invention, there is provided an integrated thermal management system for a vehicle, the system including a main refrigerant line in which a refrigerant circulates sequentially through a compressor, an inner condenser, an outdoor heat exchanger, and an evaporator, an integrated chiller that performs heat exchange between a first coolant flowing through a battery, a second coolant flowing through an electronic component, and a refrigerant, a gas injection refrigerant line branched from a downstream point of the inner condenser of the main refrigerant line based on a flow direction of a refrigerant, and connected to the compressor, and a gas injection heat exchanger that performs heat exchange between the refrigerant flowing through the gas injection refrigerant line and the refrigerant flowing through the main refrigerant line.

In the gas injection refrigerant line, an expansion valve may be provided at an upstream point of the gas injection heat exchanger so that the refrigerant in the gas injection refrigerant line may be supplied to the compressor through the gas injection heat exchanger in the expanded state.

The integrated thermal management system for a vehicle may further include a controller that controls flow and expansion of a refrigerant by controlling the compressor and expansion valve.

In a gas injection non-operation mode, the controller may block the refrigerant discharged from the inner condenser from being introduced into the gas injection refrigerant line and allow the refrigerant to flow into the main refrigerant line.

In a gas injection non-operation mode, the controller may close the expansion valve of the gas injection refrigerant line to block the refrigerant discharged from the inner condenser from being introduced into the gas injection refrigerant line and to flow to the outdoor heat exchanger.

In a gas injection operation mode, the controller may allow some of the refrigerant discharged from the inner condenser to flow to the gas injection refrigerant line and the rest to the main refrigerant line, so that heat exchange may be made between the refrigerant flowing from the gas injection heat exchanger to the main refrigerant line and the refrigerant flowing into the gas injection refrigerant line.

In a gas injection operation mode, the controller, by controlling an opening degree of the expansion valve, may allow some of the refrigerant discharged from the inner condenser to flow to the gas injection refrigerant line to expand through the expansion valve and to exchange heat with the refrigerant of the main refrigerant line in the gas injection heat exchanger, so that the refrigerant is supplied to the compressor in a heat-absorbed state.

A branch refrigerant line connected in parallel between the outdoor heat exchanger and the compressor, a first branch coolant line connected in parallel between the battery and a radiator, and a second branch coolant line connected in parallel between the electronic component and the radiator may pass through the integrated chiller, so that the heat exchange may be made between the refrigerant, the first coolant, and the second coolant through the integrated chiller.

In the gas injection refrigerant line, an expansion valve may be provided at an upstream point of the gas injection heat exchanger so that the refrigerant in the gas injection refrigerant line may be supplied to the compressor through the gas injection heat exchanger in the expanded state, and the gas injection heat exchanger may be configured such that the first branch coolant line and the second branch coolant line pass therethrough, so that the heat exchange may be made between the refrigerant flowing into the main refrigerant line through the gas injection heat exchanger, the refrigerant flowing into the gas injection refrigerant line, the first coolant, and the second coolant through the gas injection heat exchanger.

The gas injection heat exchanger may be formed integrally with the integrated chiller.

The integrated chiller in which the gas injection heat exchanger is integrally formed may be constructed by sequentially stacking first to sixth flow plates: the refrigerant in the main refrigerant line may flow through the first flow plate; the refrigerant of the gas injection refrigerant line may be introduced into the fourth flow plate and may pass through an inside thereof, and may be discharged through the second flow plate; the first coolant of the first branch coolant line may be introduced into the third flow plate and may penetrate through an inside thereof, and may be discharged through the fifth flow plate; and the refrigerant flowing into the branch refrigerant line may flow through the sixth flow plate.

An expansion valve, the gas injection heat exchanger, and a multi-way valve may be sequentially provided between the inner condenser and the outdoor heat exchanger of the main refrigerant line.

The gas injection refrigerant line may be branched at a point between the inner condenser and the expansion valve of the main refrigerant line, and may be connected to the compressor through the multi-way valve.

The integrated thermal management system for a vehicle may further include a controller that controls whether a refrigerant flows and expands by controlling the compressor, the expansion valve, and the multi-way valve, wherein in a gas injection non-operation mode, the controller may control the multi-way valve so that the refrigerant discharged from the inner condenser may flow into the main refrigerant line without being introduced into the gas injection refrigerant line.

The integrated thermal management system for a vehicle may further include a controller that controls whether a refrigerant flows and expands by controlling the compressor, the expansion valve, and the multi-way valve, wherein in a gas injection operation mode, the controller may control the multi-way valve to allow some of the refrigerant discharged from the inner condenser to flow to the gas injection refrigerant line and the rest to the main refrigerant line, so that heat exchange may be made between the refrigerant flowing from the gas injection heat exchanger to the main refrigerant line and the refrigerant flowing into the gas injection refrigerant line.

In the gas injection operation mode, the controller may control the refrigerant in the main refrigerant line to be introduced into the gas injection heat exchanger after the refrigerant is expanded through the expansion valve.

According to embodiments of the present invention, by implementing a gas injection type heat pump method with a heat exchanger, which can increase the flow rate of refrigerant in the heat pump system in the vehicle's integrated heat management system, the refrigerant flow rate is secured even under low outside temperature conditions, thereby improving energy efficiency in terms of thermal management during vehicle heating.

BRIEF DESCRIPTION OF THE DRAWINGS

The above and other objectives, features, and other advantages of embodiments of the present invention will be more clearly understood from the following detailed description when taken in conjunction with the accompanying drawings, in which.

DETAILED DESCRIPTION OF ILLUSTRATIVE EMBODIMENTS

Figure 1:
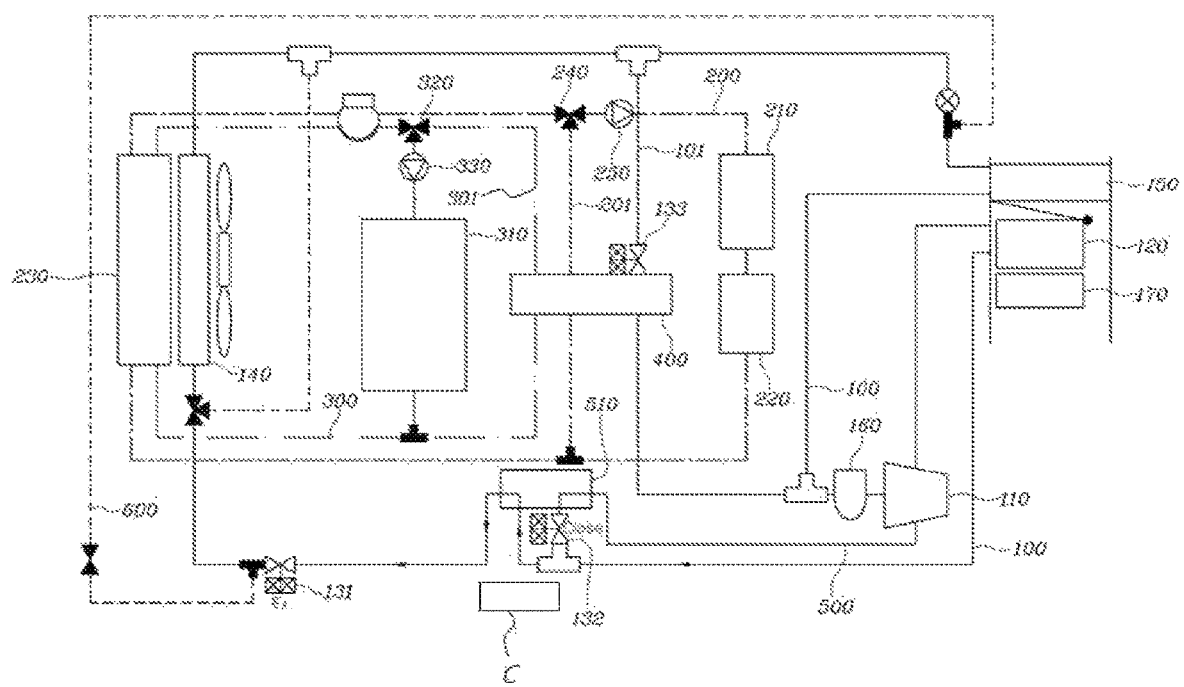
FIGS. 1 and 2 are circuit diagrams showing an integrated thermal management system for a vehicle according to a first embodiment of the present invention.

Hereinafter, embodiments of the present invention will be described in detail with reference to the accompanying drawings. However, the present invention is not limited to the embodiments disclosed below, but will be implemented in various different forms, and the embodiments are provided only so that the disclosure of the present invention is complete, and to fully inform those of ordinary skill in the scope of the invention. In the drawings, the same reference numerals refer to the same elements.

Figure 2:
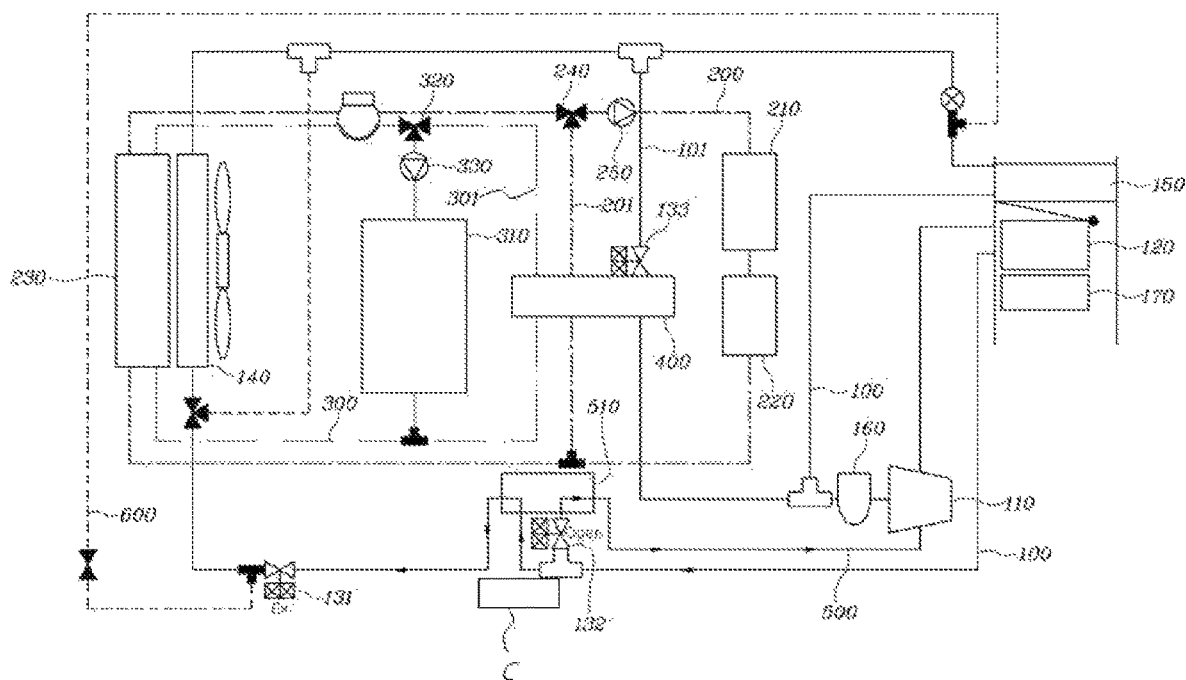
Figure 3:
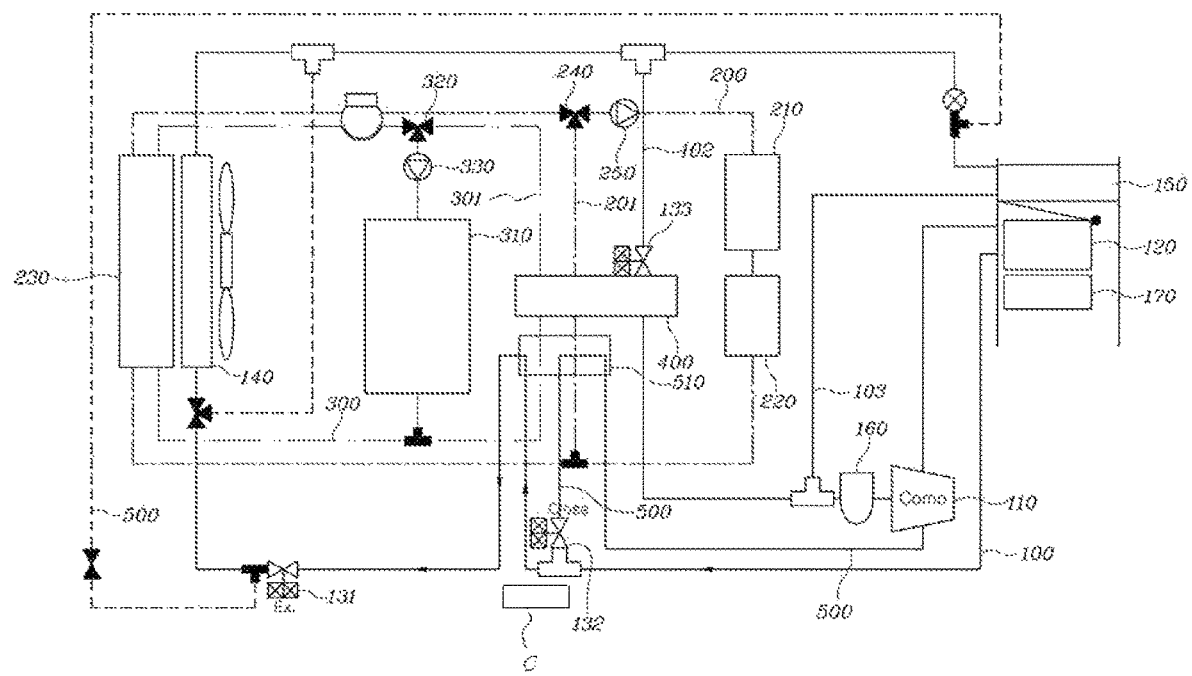
FIGS. 3 and 4 are circuit diagrams showing an integrated thermal management system for a vehicle according to a second embodiment of the present invention.
Figure 4:
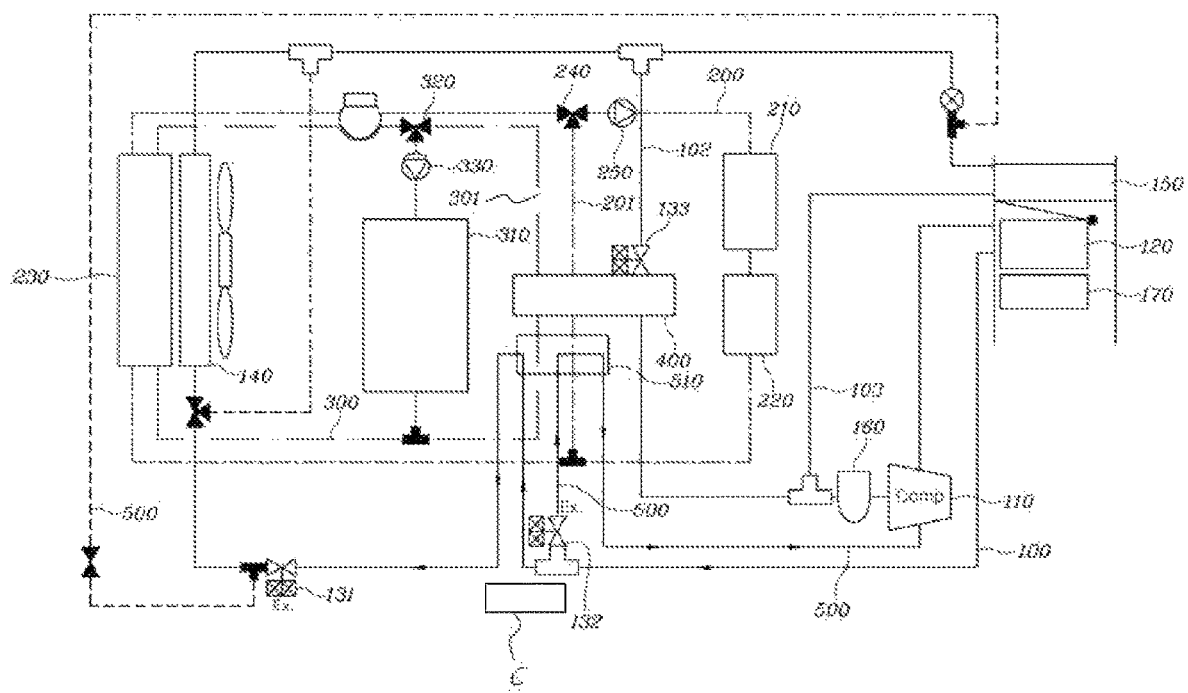
Figure 5:
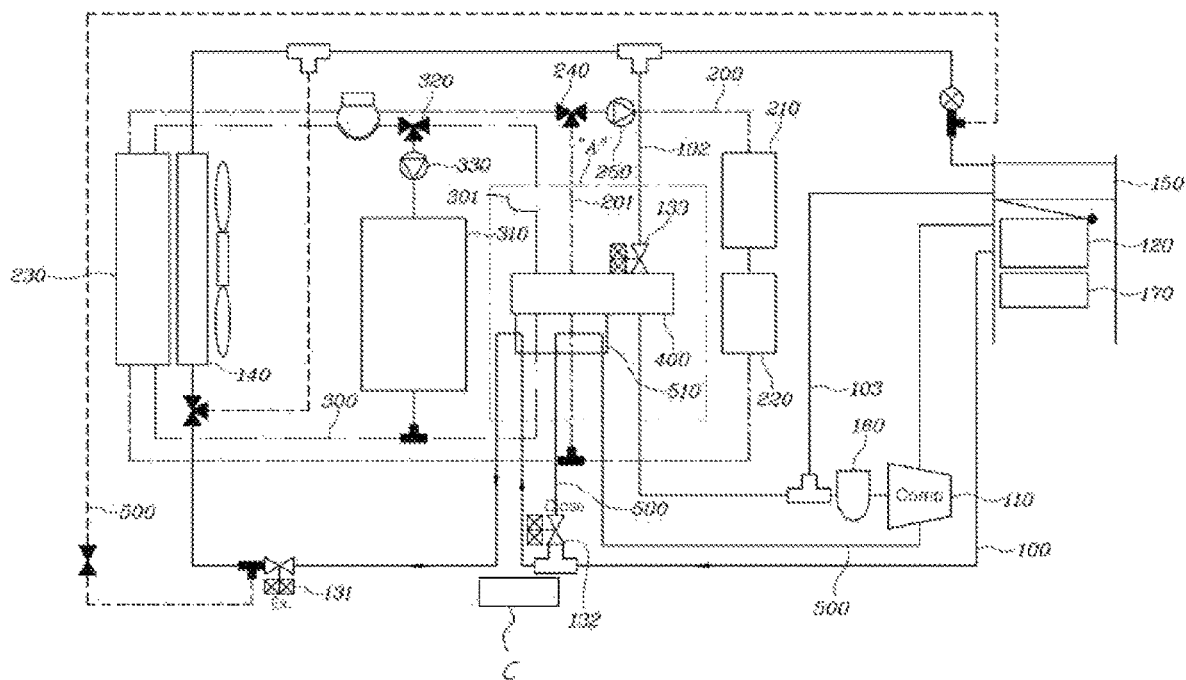
FIGS. 5 and 6 are circuit diagrams showing an integrated thermal management system for a vehicle according to a third embodiment of the present invention.
Figure 6:
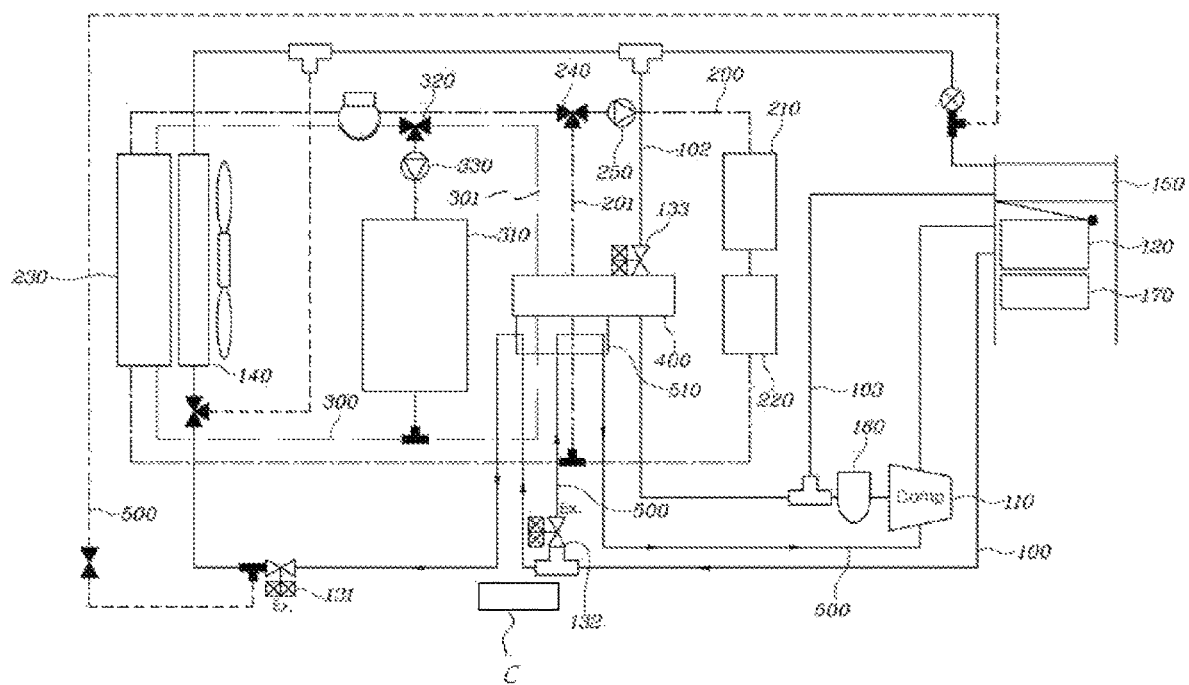
Figure 7:
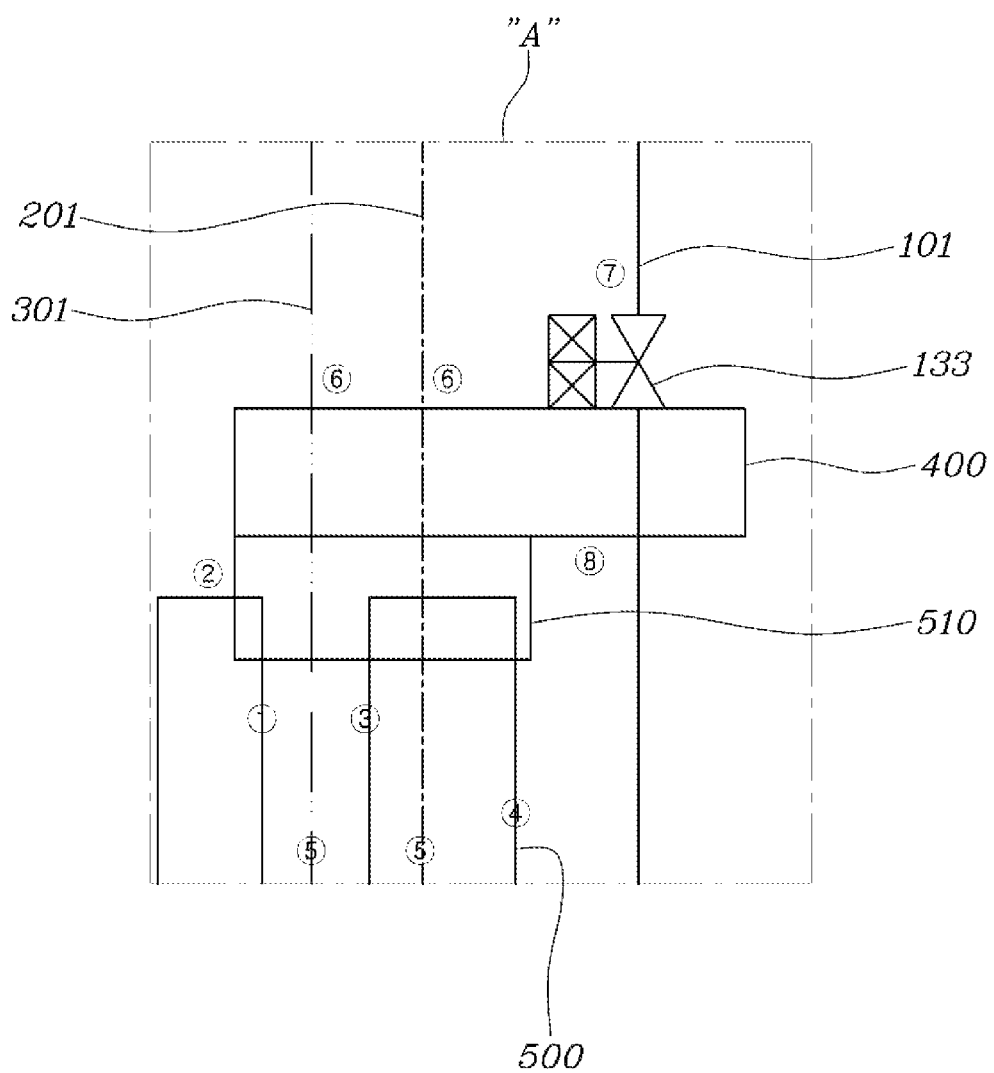
FIG. 7 is an enlarged view of area "A" of FIG. 5.
Figure 8:
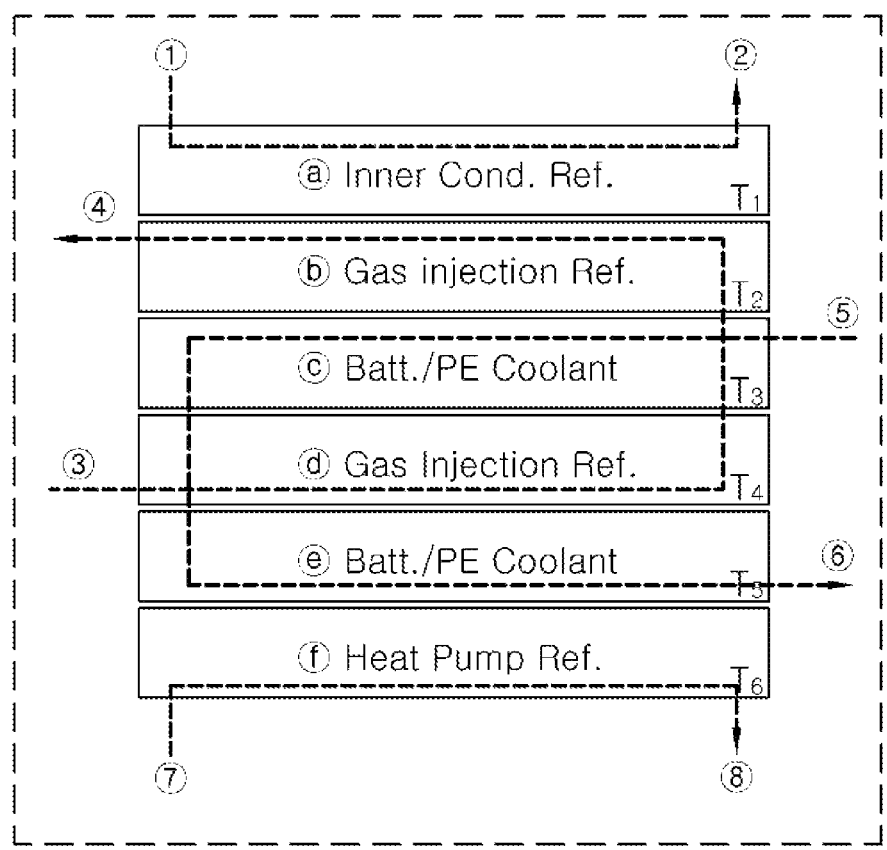
FIG. 8 is a configuration diagram showing an integrated chiller in which a gas injection heat exchanger is integrally configured in the integrated thermal management system for a vehicle according to the third embodiment of the present invention.
Figure 9:
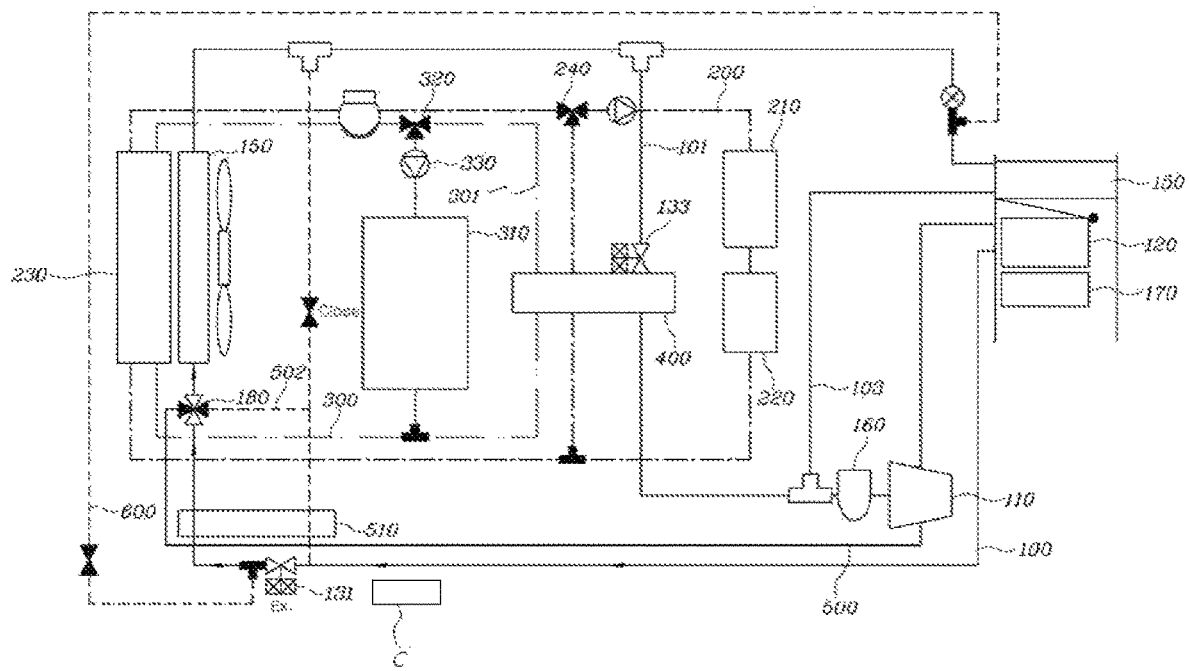
FIGS. 9 and 10 are circuit diagrams showing an integrated thermal management system for a vehicle according to a fourth embodiment of the present invention.
Figure 10:
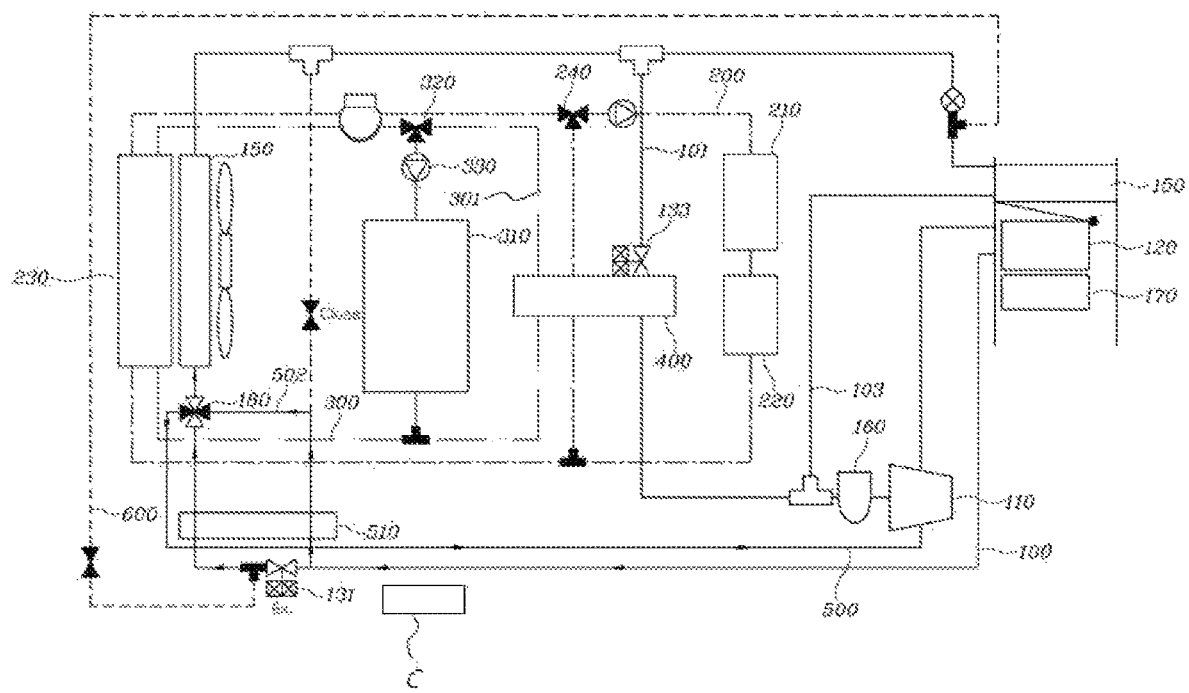

FIGS. 1 and 2 are circuit diagrams showing an integrated thermal management system for a vehicle according to a first embodiment of the present invention; FIGS. 3 and 4 are circuit diagrams showing an integrated thermal management system for a vehicle according to a second embodiment of the present invention; FIGS. 5 and 6 are circuit diagrams showing an integrated thermal management system for a vehicle according to a third embodiment of the present invention; FIG. 7 is an enlarged view of area "A" of FIG. 5; FIG. 8 is a configuration diagram showing an integrated chiller in which a gas injection heat exchanger is integrally configured in the integrated thermal management system for a vehicle according to the third embodiment of the present invention; and FIGS. 9 and 10 are circuit diagrams showing an integrated thermal management system for a vehicle according to a fourth embodiment of the present invention.

First, FIGS. 1 and 2 are circuit diagrams showing an integrated thermal management system for a vehicle according to a first embodiment of the present invention. As shown in the drawings, an integrated thermal management system for a vehicle according to embodiments of the present invention includes a main refrigerant line 100 in which a refrigerant circulates sequentially through a compressor 110, an inner condenser 120, an outdoor heat exchanger 140, and an evaporator 150, an integrated chiller 400 that performs heat exchange between a first coolant 200 flowing through a battery 210, a second coolant 300 flowing through an electronic component 310, and the refrigerant, a gas injection refrigerant line 500 branched from a downstream point of the inner condenser 120 of the main refrigerant line 100 based on a flow direction of the refrigerant, and connected to the compressor 110, and a gas injection heat exchanger 510 that performs heat exchange between the refrigerant flowing through the gas injection refrigerant line 500 and the refrigerant flowing through the main refrigerant line 100.

Although the integrated thermal management system for a vehicle of embodiments of the present invention may be applied to various thermal management systems, the first embodiment will be described first as a representative example thereof. In the case of a circuit of the first embodiment, one refrigerant is circulated, and two coolants are circulated separately from each other.

To be specific, in the case of the refrigerant, first, the refrigerant compressed by the compressor 110 flows through the inner condenser 120 provided inside an indoor air conditioner to be condensed. Thus, indoor air is heated by the heated inner condenser 120. The condensed refrigerant may be secondarily condensed through the outdoor heat exchanger 140, and reversely, may also absorb heat from the outside air through the outdoor heat exchanger 140 after being expanded through an external expansion valve 131. That is, during indoor cooling, the outdoor heat exchanger 140 operates as a condenser, and when indoor heating is required, the outdoor heat exchanger 140 operates as an evaporator. The refrigerant that has passed through the outdoor heat exchanger 140 is combined after passing through the integrated chiller 400 or the evaporator 150 of the indoor air conditioner connected in parallel, passes through an accumulator 160, and then is recovered to the compressor 110. In addition, the integrated chiller 400 may cool the coolant or raise the temperature of the coolant by the operation of an integrated expansion valve 133 provided at the front end of the integrated chiller 400.

The coolant may be divided into the first coolant 200 flowing through the battery 210 and the second coolant 300 flowing through the electronic component 310. The first coolant 200 basically circulates the battery 210 and a radiator 230, branches in parallel from the corresponding line, flows through the integrated chiller 400, and exchanges heat with a refrigerant. Accordingly, the battery 210 may be cooled by the radiator 230 or the integrated chiller 400, and the temperature of the battery 210 may be raised by the integrated chiller 400 and may also be raised by a separate water heating heater 220. It is also possible to transfer waste heat of the battery 210 through the integrated chiller 400 and utilize it for indoor heating by using a heat pump. The flow path selection of the first coolant 200 is made by the multi-way valve 240.

For the electronic component 310, heat may be radiated by the radiator 230 with the help of the second coolant 300. In addition, waste heat is transferred through the integrated chiller 400 connected in parallel so that the waste heat may be utilized for heating through the heat pump. The flow path selection of the second coolant 300 is made by the multi-way valve 240.

In the case of heat-pump heating through waste heat recovery among the various thermal management modes above, when the temperature of the outside air is too low or the temperature of electronic components, etc. is too low, the density of the refrigerant flowing into the compressor is lowered, making it difficult to secure a sufficient flow rate, thereby deteriorating the overall heating performance and efficiency.

Therefore, in order to solve this problem, embodiments of the present invention aim to increase the refrigerant flow rate through gas injection.

To this end, the gas injection refrigerant line 500 is branched from the downstream point of the inner condenser 120 of the main refrigerant line 100 based on the flow direction of the refrigerant and is connected to the compressor 110. Then, the gas injection heat exchanger 510 performs heat exchange between the refrigerant flowing through the gas injection refrigerant line 500 and the refrigerant flowing through the main refrigerant line 100.

In addition, in the gas injection refrigerant line 500, an expansion valve 132 is provided at an upstream point of the gas injection heat exchanger 510 so that the refrigerant of the gas injection refrigerant line 500 may be supplied to the compressor 110 through the gas injection heat exchanger 510 in an expanded state.

By the above configuration, most of the refrigerant discharged from the inner condenser 120 is supplied to the outdoor heat exchanger 140 or the integrated chiller 400, but a portion of the refrigerant is supplied to the gas injection heat exchanger 510 after being expanded through the expansion valve 132. The original refrigerant before expansion and before being supplied to the outdoor heat exchanger 140 or the integrated chiller 400 exchanges heat with the refrigerant expanded in the gas injection heat exchanger 510. Accordingly, the refrigerant of the gas injection refrigerant line 500 is warmed up after expansion, and is supplied to the compressor 110 in a gaseous state to secure the flow rate of the refrigerant discharged from the compressor and to increase the heating performance. In this case, the compressor 110 may be of a type in which refrigerant is introduced through two refrigerant inlets, compressed, and discharged through one outlet.

Whether or not the gas injection is performed and the degree to which the gas injection is performed may be controlled by the controller C controlling the compressor and the expansion valve to control whether the refrigerant flows or expands.

FIG. 1 shows a gas injection non-operation mode of the integrated thermal management system of the first embodiment. When the gas injection is not in operation, the controller C may block the refrigerant discharged from the inner condenser 120 from being introduced into the gas injection refrigerant line 500 and allow the refrigerant to flow into the main refrigerant line 100. To this end, in the gas injection non-operation mode, the controller C may close the expansion valve 132 of the gas injection refrigerant line 500 to block the refrigerant discharged from the inner condenser 120 from being introduced into the gas injection refrigerant line 500 and allow the refrigerant to flow into the outdoor heat exchanger 140. In this case, the temperature of the outside air is secured to some extent, so it is possible to secure sufficient heat through the outdoor heat exchanger 140, and through this, the density and flow rate of the refrigerant may be secured. Thus, it is more advantageous in terms of overall efficiency to secure sufficient heat through the outdoor heat exchanger 140 than to utilize gas injection.

Meanwhile, FIG. 2 shows a gas injection operation mode. When the gas injection is in operation, the controller C allows some of the refrigerant discharged from the inner condenser 120 to flow to the gas injection refrigerant line 500 and the rest to the main refrigerant line 100, so that heat exchange is made between the refrigerant flowing from the gas injection heat exchanger 510 to the main refrigerant line 100 and the refrigerant flowing into the gas injection refrigerant line 500. That is, in the gas injection operation mode, the controller C by controlling an opening degree of the expansion valve, allows some of the refrigerant discharged from the inner condenser 120 to flow to the gas injection refrigerant line 500 to expand through the expansion valve 132 and to exchange heat with the refrigerant of the main refrigerant line 100 in the gas injection heat exchanger, so that the refrigerant is supplied to the compressor in a heat-absorbed state.

Through this process, it is possible to improve various inefficient situations, such as when the outside air temperature is too low or when frost is formed on the outdoor heat exchanger.

FIGS. 3 and 4 show the second embodiment of the present invention. In this case, as a branch refrigerant line 102 connected in parallel between the outdoor heat exchanger 140 and the compressor 110, a first branch coolant line 201 connected in parallel between the battery 210 and the radiator 230, and a second branch coolant line 301 connected in parallel between the electronic component 310 and the radiator 230 pass through the integrated chiller 400, the heat exchange is made between the refrigerant, the first coolant, and the second coolant through the integrated chiller 400.

The integrated chiller 400 is configured such that the refrigerant, the first coolant, and the second coolant flow independently of each other and exchange heat with each other. To this end, the branch refrigerant line 102 through which the refrigerant flowing through the outdoor heat exchanger 140 flows, the first branch coolant line 201 through which the first coolant flowing through the battery flows, and the second branch coolant line 301 through which the second coolant flowing through the electronic component flows are passed through the integrated chiller.

In the gas injection refrigerant line 500, the expansion valve 132 is provided at an upstream point of the gas injection heat exchanger 510 so that the refrigerant in the gas injection refrigerant line 500 is supplied to the compressor through the gas injection heat exchanger 510 in the expanded state.

In addition, the gas injection heat exchanger 510 is configured such that the first branch coolant line 201 and the second branch coolant line 301 pass therethrough, so that the heat exchange is made between the refrigerant flowing into the main refrigerant line 100 through the gas injection heat exchanger 510, the refrigerant flowing into the gas injection refrigerant line, the first coolant, and the second coolant through the gas injection heat exchanger 510. That is, the refrigerant flowing through the gas injection refrigerant line 500 needs to absorb heat after expansion, and the heat is not only obtained through the original refrigerant, but also through the additionally warmed first coolant 200 or second coolant 300. This allows a higher temperature refrigerant to be introduced into the compressor, and accordingly, it is possible to obtain the effect of further increasing the heating efficiency.

FIG. 3 shows the flow of refrigerant when gas injection is not used, and shows a case in which the refrigerant flows only through the main refrigerant line 100 by closing the expansion valve 132. FIG. 4 shows a case in which gas injection is used. After a portion of the refrigerant is branched and expanded, it is warmed up by the existing refrigerant and coolant, and then added to the compressor 110.

Meanwhile, FIGS. 5 and 6 show the third embodiment of the present invention. In this case, the gas injection heat exchanger 510 is integrally formed with the integrated chiller 400, so that one heat exchanger implements both functions. As in the second embodiment, the operation relationship shows a case in which gas injection is not used in FIG. 5 and a case in which gas injection is used in FIG. 6.

However, the third embodiment is somewhat different from the second embodiment in that the gas injection heat exchanger and the integrated chiller are integrated.

FIG. 7 is an enlarged view of area "A" of FIG. 5, and FIG. 8 is a configuration diagram showing an integrated chiller in which a gas injection heat exchanger is integrally configured in the integrated thermal management system for a vehicle according to the third embodiment of the present invention.

When the gas injection heat exchanger 510 and the integrated chiller 400 are integrated, it is possible to be mechanically integrated as shown in FIG. 7, and it is also possible to stack a plurality of flow plates as shown in FIG. 8.

In the case of FIG. 7, the refrigerant passes through the expansion valve 133 integrated in the chiller, then flows through the integrated chiller 400, and the first coolant 200 and the second coolant 300 also flow through the integrated chiller 400. The gas injection heat exchanger 510 is directly connected to the side of the integrated chiller 400, and the first coolant 200 and the second coolant 300 are directly introduced into the gas injection heat exchanger 510 and pass therethrough. At the same time, the main refrigerant and the gas injection refrigerant flow through the gas injection heat exchanger 510.

FIG. 8 is a case in which these two heat exchangers are integrally manufactured. In this case, the first to sixth flow plates (a to f) are sequentially stacked and configured, the refrigerant in the main refrigerant line may flow through the first flow plate (a), the refrigerant of the gas injection refrigerant line may be introduced into the fourth flow plate (d) and then pass through the inside and be discharged through the second flow plate (b), the first coolant of the first branch coolant line may be introduced into the third flow plate (c) and then pass through the inside and be discharged through the fifth flow plate (e), and the refrigerant flowing into the branch refrigerant line may flow through the sixth flow plate (f).

The temperature of the fluid flowing through each flow plate may be determined in the following order.

T1>T3>T5>T2>T4>T6

T1 (inner condenser), T3, and T5 (first coolant/second coolant) correspond to the configuration of a heat source that provides heat, whereas T2, T4 (gas injection refrigerant), and T6 (main refrigerant) correspond to the configuration of a heat absorber that absorbs heat.

Therefore, according to the configuration of the flow plate order as above, it is possible to minimize unnecessary heat transfer by disposing each flow plate such that a temperature difference from an adjacent flow plate is minimized.

FIGS. 9 and 10 are circuit diagrams showing an integrated thermal management system for a vehicle according to the fourth embodiment of the present invention.

In this case, the expansion valve 131, the gas injection heat exchanger 510, and the multi-way valve 180 may be sequentially provided between the inner condenser 120 and the outdoor heat exchanger 140 of the main refrigerant line 100.

The gas injection refrigerant line 500 may be branched at a point between the inner condenser 120 and the expansion valve 131 of the main refrigerant line 100 and may be connected to the compressor 110 through the multi-way valve 180.

The controller C controls whether or not the refrigerant flows and expands by controlling the compressor 110, the expansion valve 131, and the multi-way valve 180.

This is a case where the outdoor heat exchanger 140 and the expansion valve 131 are used together, rather than using a separate expansion valve only for the gas injection heat exchanger 510.

Accordingly, in the gas injection non-operation mode, the controller C may control the multi-way valve 180 so that the refrigerant discharged from the inner condenser 120 flows into the main refrigerant line 100 without being introduced into the gas injection refrigerant line 500.

In the gas injection operation mode, the controller C may control the multi-way valve 180 so that some of the refrigerant discharged from the inner condenser 120 flows to the gas injection refrigerant line 500 and the rest to the main refrigerant line 100, and thus heat exchange is made between the refrigerant flowing from the gas injection heat exchanger 510 to the main refrigerant line 100 and the refrigerant flowing into the gas injection refrigerant line 500. To be specific, some of the refrigerant discharged from the inner condenser 120 is branched at an upstream point of the expansion valve 131 and flows through the gas injection heat exchanger 510, and flows into the gas injection refrigerant line 500 through a branched line 502. The remaining refrigerant flows through the gas injection heat exchanger 510 to exchange heat after passing through the expansion valve 131, and flows to the main refrigerant line 100 through the outdoor heat exchanger 140.

According to embodiments of the present invention, by implementing a gas injection type heat pump method with a heat exchanger, which can increase the flow rate of refrigerant in the heat pump system in the vehicle's integrated heat management system, the refrigerant flow rate is secured even under low outside temperature conditions, thereby improving energy efficiency in terms of thermal management during vehicle heating.

Although the present invention has been described with reference to the accompanying drawings and the above-described preferred embodiments, the present invention is not limited thereto, but is defined by the following claims. Accordingly, those of ordinary skill in the art can variously change and modify the present invention within the scope without departing from the spirit of the claims to be described later.

What is claimed is:

1. An integrated thermal management system for a vehicle, the system comprising:
    a main refrigerant line configured to circulate a refrigerant sequentially through a compressor, an inner condenser, an outdoor heat exchanger, and an evaporator;
    an integrated chiller configured to perform heat exchange between a first coolant flowing through a battery, a second coolant flowing through an electronic component, and the refrigerant;
    a gas injection refrigerant line branched from a downstream point of the inner condenser of the main refrigerant line based on a flow direction of the refrigerant and connected to the compressor;
    a gas injection heat exchanger configured to perform heat exchange between the refrigerant flowing through the gas injection refrigerant line and the refrigerant flowing through the main refrigerant line;
    a branch refrigerant line connected in parallel between the outdoor heat exchanger and the compressor, passing through the integrated chiller;
    a first branch coolant line connected in parallel between the battery and a radiator, passing through the integrated chiller; and
    a second branch coolant line connected in parallel between the electronic component and the radiator, passing through the integrated chiller;
    wherein the system is configured so that after heat exchange is performed between the refrigerant flowing through the gas injection refrigerant line and the refrigerant flowing through the main refrigerant line, heat exchange is performed with the first coolant and the second coolant flowing through the first branch coolant line and the second branch coolant line.

2. The system of claim 1, further comprising an expansion valve provided in the gas injection refrigerant line at an upstream point of the gas injection heat exchanger so that the refrigerant in the gas injection refrigerant line is supplied to the compressor through the gas injection heat exchanger in an expanded state.

3. The system of claim 2, further comprising a controller configured to control flow and expansion of the refrigerant by controlling the compressor and the expansion valve.

4. The system of claim 3, wherein in a gas injection non-operation mode, the controller is configured to block the refrigerant discharged from the inner condenser from being introduced into the gas injection refrigerant line and to allow the refrigerant to flow into the main refrigerant line.

5. The system of claim 3, wherein in a gas injection non-operation mode, the controller is configured to close the expansion valve of the gas injection refrigerant line to block the refrigerant discharged from the inner condenser from being introduced into the gas injection refrigerant line and to flow to the outdoor heat exchanger.

6. The system of claim 3, wherein in a gas injection operation mode, the controller is configured to allow some of the refrigerant discharged from the inner condenser to flow to the gas injection refrigerant line and a remainder of the refrigerant to flow to the main refrigerant line, so that heat exchange is made between the refrigerant flowing from the gas injection heat exchanger to the main refrigerant line and the refrigerant flowing into the gas injection refrigerant line.

7. The system of claim 3, wherein in a gas injection operation mode, the controller, by controlling an opening degree of the expansion valve, is configured to allow some of the refrigerant discharged from the inner condenser to flow to the gas injection refrigerant line to expand through the expansion valve and to exchange heat with the refrigerant of the main refrigerant line in the gas injection heat exchanger, so that the refrigerant is supplied to the compressor in a heat-absorbed state.

8. The system of claim 1,
    wherein the system is configured so that as the branch refrigerant line, the first branch coolant line, and the second branch coolant line pass through the integrated chiller, the heat exchange is made between the refrigerant, the first coolant, and the second coolant through the integrated chiller.

9. The system of claim 8, wherein the gas injection heat exchanger is configured such that the first branch coolant line and the second branch coolant line pass therethrough, so that the heat exchange is made between the refrigerant flowing into the main refrigerant line through the gas injection heat exchanger, the refrigerant flowing into the gas injection refrigerant line, the first coolant, and the second coolant through the gas injection heat exchanger.

10. The system of claim 8, wherein the gas injection heat exchanger is formed integrally with the integrated chiller.

11. The system of claim 10, wherein the integrated chiller in which the gas injection heat exchanger is integrally formed is constructed by sequentially stacking first to sixth flow plates.

12. The system of claim 11, wherein the refrigerant in the main refrigerant line flows through the first flow plate, the refrigerant of the gas injection refrigerant line is introduced into the fourth flow plate, passes through an inside thereof, and is discharged through the second flow plate, the first coolant of the first branch coolant line is introduced into the third flow plate, penetrates through an inside thereof, and is discharged through the fifth flow plate, and the refrigerant flowing into the branch refrigerant line flows through the sixth flow plate.

13. The system of claim 1, wherein an expansion valve, the gas injection heat exchanger, and a multi-way valve are sequentially provided between the inner condenser and the outdoor heat exchanger of the main refrigerant line.

14. The system of claim 13, wherein the gas injection refrigerant line is branched at a point between the inner condenser and the expansion valve of the main refrigerant line and is connected to the compressor through the multi-way valve.

15. The system of claim 14, further comprising a controller configured to control whether the refrigerant flows and expands by controlling the compressor, the expansion valve, and the multi-way valve.

16. The system of claim 15, wherein in a gas injection non-operation mode, the controller is configured to control the multi-way valve so that the refrigerant discharged from the inner condenser flows into the main refrigerant line without being introduced into the gas injection refrigerant line.

17. The system of claim 15, wherein in a gas injection operation mode, the controller is configured to control the multi-way valve to allow some of the refrigerant discharged from the inner condenser to flow to the gas injection refrigerant line and a remainder of the refrigerant to flow to the main refrigerant line, so that heat exchange is made between the refrigerant flowing from the gas injection heat exchanger to the main refrigerant line and the refrigerant flowing into the gas injection refrigerant line.

18. The system of claim 17, wherein in the gas injection operation mode, the controller is configured to control the refrigerant in the main refrigerant line to be introduced into the gas injection heat exchanger after the refrigerant is expanded through the expansion valve.

19. An integrated thermal management system for a vehicle, the system comprising:
a main refrigerant line configured to circulate a refrigerant sequentially through a compressor, an inner condenser, an outdoor heat exchanger, and an evaporator;
an integrated chiller configured to perform heat exchange between a first coolant flowing through a battery, a second coolant flowing through an electronic component, and the refrigerant;
a gas injection refrigerant line branched from a downstream point of the inner condenser of the main refrigerant line based on a flow direction of the refrigerant and connected to the compressor;
a gas injection heat exchanger configured to perform heat exchange between the refrigerant flowing through the gas injection refrigerant line and the refrigerant flowing through the main refrigerant line;
a branch refrigerant line connected in parallel between the outdoor heat exchanger and the compressor;
a first branch coolant line connected in parallel between the battery and a radiator;
a second branch coolant line connected in parallel between the electronic component and the radiator, wherein as the branch refrigerant line, the first branch coolant line, and the second branch coolant line pass through the integrated chiller, the heat exchange is made between the refrigerant, the first coolant, and the second coolant through the integrated chiller;
an expansion valve provided in the gas injection refrigerant line at an upstream point of the gas injection heat exchanger so that the refrigerant in the gas injection refrigerant line is supplied to the compressor through the gas injection heat exchanger in an expanded state;
wherein the gas injection heat exchanger is configured such that the first branch coolant line and the second branch coolant line pass therethrough, so that the heat exchange is made between the refrigerant flowing into the main refrigerant line through the gas injection heat exchanger, the refrigerant flowing into the gas injection refrigerant line, the first coolant, and the second coolant through the gas injection heat exchanger.

20. An integrated thermal management system for a vehicle, the system comprising:
a main refrigerant line configured to circulate a refrigerant sequentially through a compressor, an inner condenser, an outdoor heat exchanger, and an evaporator;
an integrated chiller configured to perform heat exchange between a first coolant flowing through a battery, a second coolant flowing through an electronic component, and the refrigerant;
a gas injection refrigerant line branched from a downstream point of the inner condenser of the main refrigerant line based on a flow direction of the refrigerant and connected to the compressor;
a gas injection heat exchanger configured to perform heat exchange between the refrigerant flowing through the gas injection refrigerant line and the refrigerant flowing through the main refrigerant line;
a branch refrigerant line connected in parallel between the outdoor heat exchanger and the compressor;
a first branch coolant line connected in parallel between the battery and a radiator; and
a second branch coolant line connected in parallel between the electronic component and the radiator, wherein as the branch refrigerant line, the first branch coolant line, and the second branch coolant line pass through the integrated chiller, the heat exchange is made between the refrigerant, the first coolant, and the second coolant through the integrated chiller;
wherein the gas injection heat exchanger is formed integrally with the integrated chiller;
wherein the integrated chiller in which the gas injection heat exchanger is integrally formed is constructed by sequentially stacking first to sixth flow plates; and
wherein the system is configured so that the refrigerant in the main refrigerant line flows through the first flow plate, the refrigerant of the gas injection refrigerant line is introduced into the fourth flow plate, passes through an inside thereof, and is discharged through the second flow plate, the first coolant of the first branch coolant line is introduced into the third flow plate, penetrates through an inside thereof, and is discharged through the fifth flow plate, and the refrigerant flowing into the branch refrigerant line flows through the sixth flow plate.

* * * * *